United States Patent
Dringenberg et al.

(10) Patent No.: US 7,063,375 B2
(45) Date of Patent: Jun. 20, 2006

(54) ANGULARLY ADJUSTABLE ILLUMINATED SPOILER (75) Inventors: Steven A. Dringenberg, Eldorado Hills, CA (US); Michael A. Herold, Akron, OH (US)

(73) Assignee: All Sales Manufacturing, Inc., Shingle Springs, CA (US)

( * ) Notice: Subject to any disclaimer, the term of this patent is extended or adjusted under 35 U.S.C. 154(b) by 0 days.

(21) Appl. No.: 11/180,460

(22) Filed: Jul. 12, 2005

(65) Prior Publication Data

US 2005/0248182 A1   Nov. 10, 2005

Related U.S. Application Data (62) Division of application No. 10/678,022, filed on Oct. 3, 2003.

(51) Int. Cl.
B62D 35/00 (2006.01)
(52) U.S. Cl. .................................................. 296/180.5
(58) Field of Classification Search .. 296/180.1–180.5; 180/903; 188/2 R; 40/541, 584, 588, 591, 40/592, 596, 602
See application file for complete search history.

(56) References Cited

U.S. PATENT DOCUMENTS

| 2,560,117 | A | * | 7/1951 | Mallary .......................... 40/443 |
| 3,318,031 | A | * | 5/1967 | Whaley et al. ............... 40/592 |
| 3,523,856 | A | * | 8/1970 | Yaeger ........................ 428/113 |
| 3,591,942 | A | * | 7/1971 | Van Swearingen ............ 40/615 |
| 3,596,974 | A | * | 8/1971 | Adams ..................... 296/180.2 |
| 3,892,959 | A |   | 7/1975 | Pulles ........................ 240/1 EL |
| 4,087,124 | A | * | 5/1978 | Wiley, Jr. ................. 296/180.2 |
| 4,098,534 | A | * | 7/1978 | Wood ....................... 296/180.4 |
| 4,334,211 | A | * | 6/1982 | McConnell et al. ........ 340/474 |
| 4,446,508 | A |   | 5/1984 | Kinzie ......................... 362/31 |
| 4,557,517 | A | * | 12/1985 | Bolduc et al. .............. 362/485 |
| 4,990,804 | A | * | 2/1991 | McNair ................... 250/493.1 |
| 5,275,249 | A | * | 1/1994 | Nelson ....................... 180/69.2 |
| 5,433,024 | A |   | 7/1995 | Lerner .......................... 40/546 |
| 5,536,558 | A | * | 7/1996 | Shelton ....................... 428/167 |
| 5,743,616 | A |   | 4/1998 | Guiuliano et al. ............ 362/31 |
| 5,825,281 | A |   | 10/1998 | McCreary ................ 340/425.5 |
| 5,871,254 | A | * | 2/1999 | Burg ........................ 296/180.1 |
| 6,056,425 | A | * | 5/2000 | Appelberg .................. 362/493 |
| 6,449,889 | B1 |   | 9/2002 | Hottenstein ................... 40/575 |
| 6,899,450 | B1 | * | 5/2005 | A-Gi ........................... 362/496 |
| 2002/0141174 | A1 |   | 10/2002 | Parker et al. ................. 362/31 |
| 2002/0157292 | A1 |   | 10/2002 | Landers, Jr. et al. .......... 40/546 |

FOREIGN PATENT DOCUMENTS

GB   2 254 303 A   10/1992

* cited by examiner

Primary Examiner—H Gutman
(74) Attorney, Agent, or Firm—Renner, Kenner, Greive, Bobak, Taylor & Weber (57) ABSTRACT A spoiler for a vehicle includes at least one support bracket having a first end secured to the vehicle and a substantially transparent spoiler wing secured to the second end. The spoiler may also include at least one support bracket that is adjustable to change the angular orientation of the spoiler wing. In the alternative, a lighted wing for attachment to a surface may include at least one bracket adapted to be secured to the surface and a substantially transparent wing secured by the bracket to the surface. A material may be interposed and secured between the wing and the surface with a light module coupled to the wing for illumination thereof.

13 Claims, 6 Drawing Sheets

ANGULARLY ADJUSTABLE ILLUMINATED SPOILER

CROSS REFERENCE TO RELATED APPLICATION

This is a divisional application of application Ser. No. 10/678,022 filed Oct. 3, 2003.

TECHNICAL FIELD

The present invention herein resides generally in the art of after-market automobile accessories. Specifically, the present invention is related to spoilers or like attachments secured to the body of a vehicle. More specifically, the present invention relates to an illuminated spoiler which provides for angular adjustments of the spoiler with respect to the vehicle.

BACKGROUND ART

Ever since the mass marketing of automobiles there has been a desire by consumers to provide a distinct personal touch to their vehicle. Indeed, consumers often express themselves by the colors they choose and the various exterior accessories they attach to their vehicle. For example, some individuals provide added chrome accessories to their vehicle along with striping and other air-brush painting to side panels, hoods, trunks and other visible surfaces. Recently, under-the-car lighting and illumination of license plates has become popular. It has also become quite fashionable to provide spoilers which provide some benefit of reducing aerodynamic drag, but which are primarily used for decorative attachment. Accordingly, a need has arisen for further enhancing the appearance of spoilers or other vehicle body panels by illumination.

SUMMARY OF THE INVENTION

In light of the foregoing, it is first aspect of the present invention to provide an angularly adjustable illuminated spoiler.

Another object of the present invention, which shall become apparent as the detailed description proceeds, is achieved by a spoiler for a vehicle includes at least one support bracket having a first end opposite a second end adapted to have the first end secured to the vehicle and a substantially transparent spoiler wing secured to the second end.

Other aspects of the present invention are attained by a spoiler for a vehicle comprising at least one support bracket having a first end opposite a second end, the first end adapted to be secured to the vehicle; a substantially transparent spoiler wing secured to the second end, wherein the at least one support bracket is adjustable to change the angular orientation of the spoiler wing.

Still another object of the present invention is attained by a lighted wing for attachment to a surface, comprising at least one bracket adapted to be secured to the surface; a substantially transparent wing secured by the at least one bracket to the surface;

a material interposed between the wing and the surface; and a light module coupled to the wing for illumination of the wing.

These and other objects of the present invention, as well as the advantages thereof over existing prior art forms, which will become apparent from the description to follow, are accomplished by the improvements hereinafter described and claimed.

BRIEF DESCRIPTION OF THE DRAWINGS

For a complete understanding of the objects, techniques and structure of the invention, reference should be made to the following detailed description and accompanying drawings, wherein:

FIGS. 5A and 5B are cross-sectional views of the illuminated spoiler taken along lines 5—5 of FIG. 3, wherein FIG. 5A shows the illuminated spoiler in a first angular position and wherein FIG. 5B shows the illuminated spoiler in a different angular configuration;

BEST MODE FOR CARRYING OUT THE INVENTION

Figure 1:
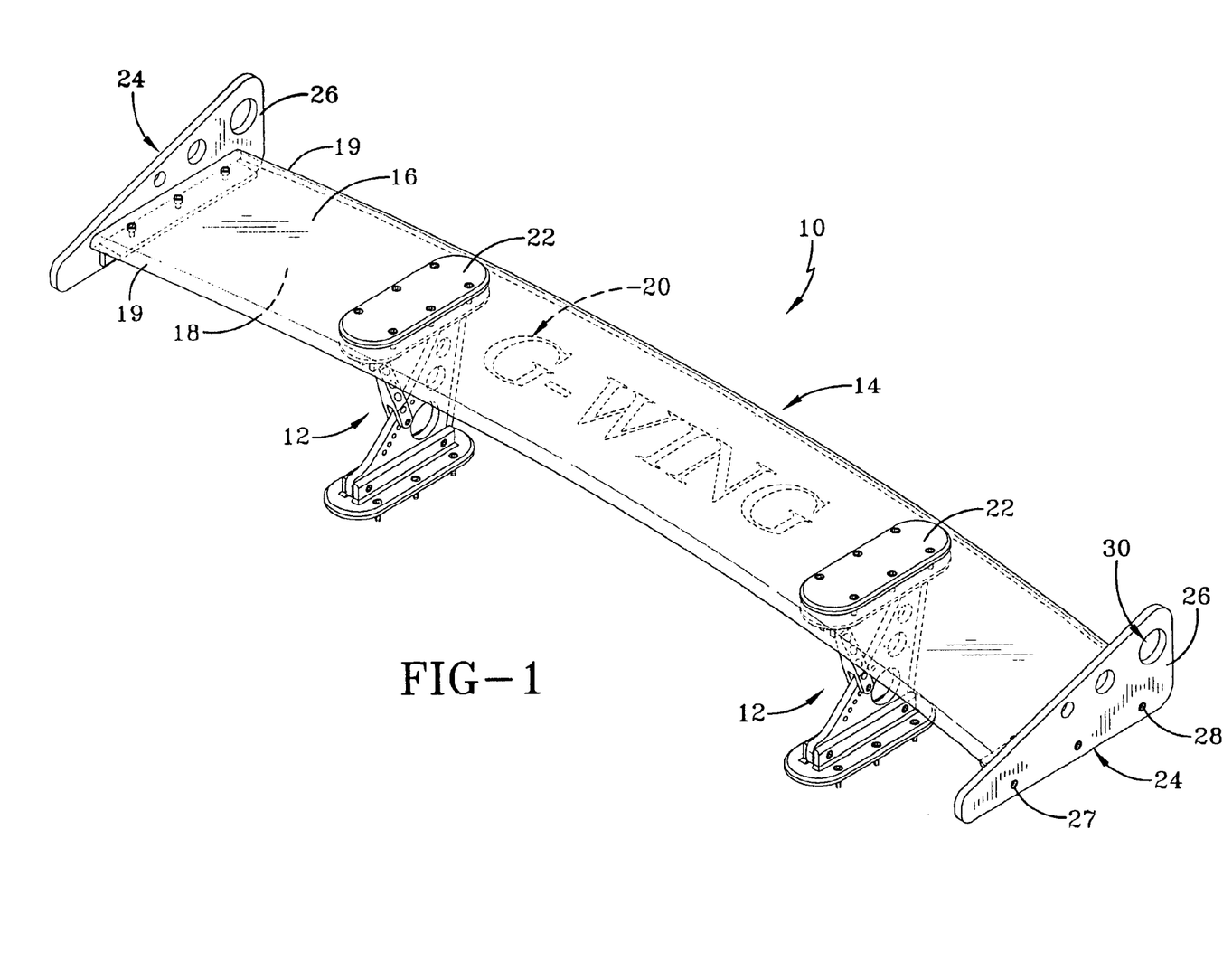
FIG. 1 is a perspective view of an illuminated spoiler according to the teachings of the present invention.

Referring now to all of the drawings and in particular to FIG. 1 it can be seen that an illuminated spoiler made according to the present invention is designated generally by the numeral 10. It is believed that the illuminated spoiler will likely be attached to or mounted upon an exterior surface of a trunk of an automobile or other vehicle such as a truck, boat or the like. It is believed that the illuminated spoiler 10 shown herein will be installed as an after-market accessory although it could be factory installed.

Figure 4:
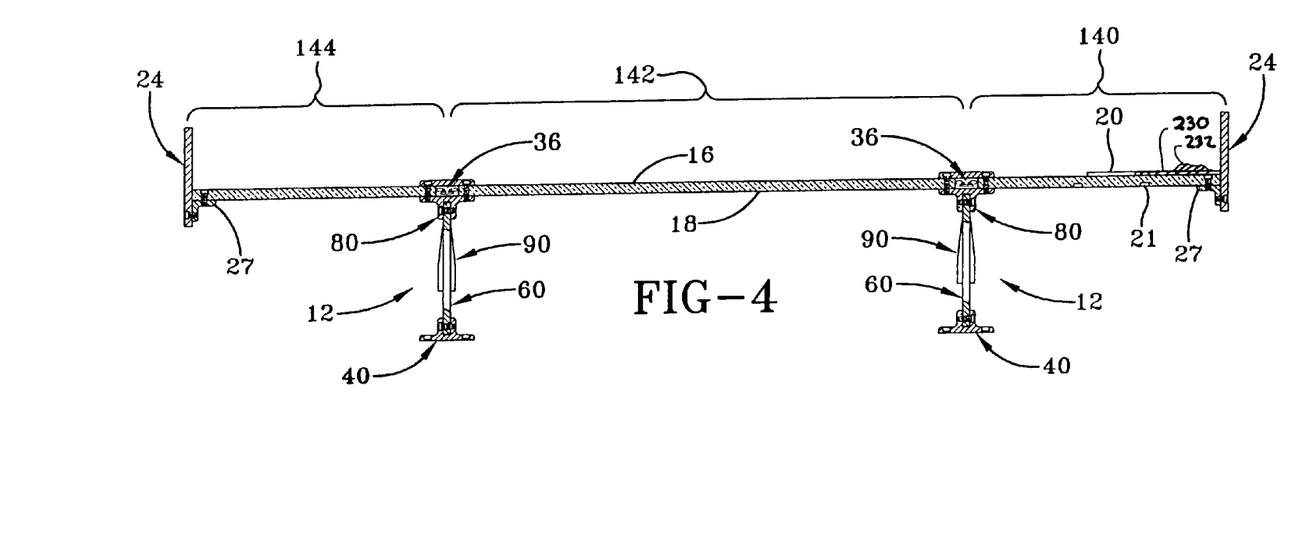
FIG. 4 is a cross-sectional view taken along lines 4—4 of FIG. 3.
Figure 5A:
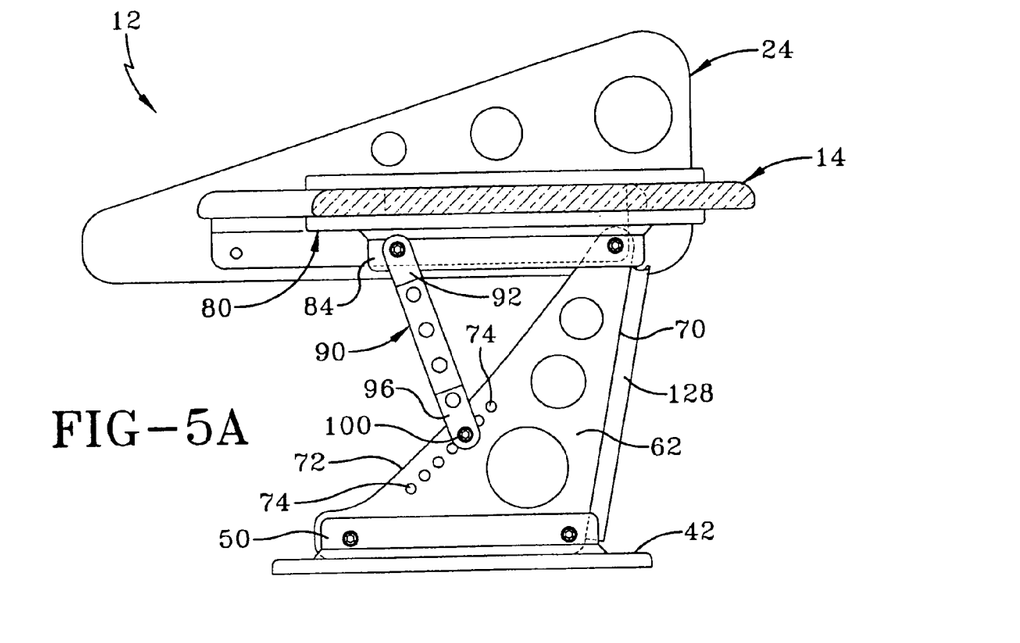
Figure 5B:
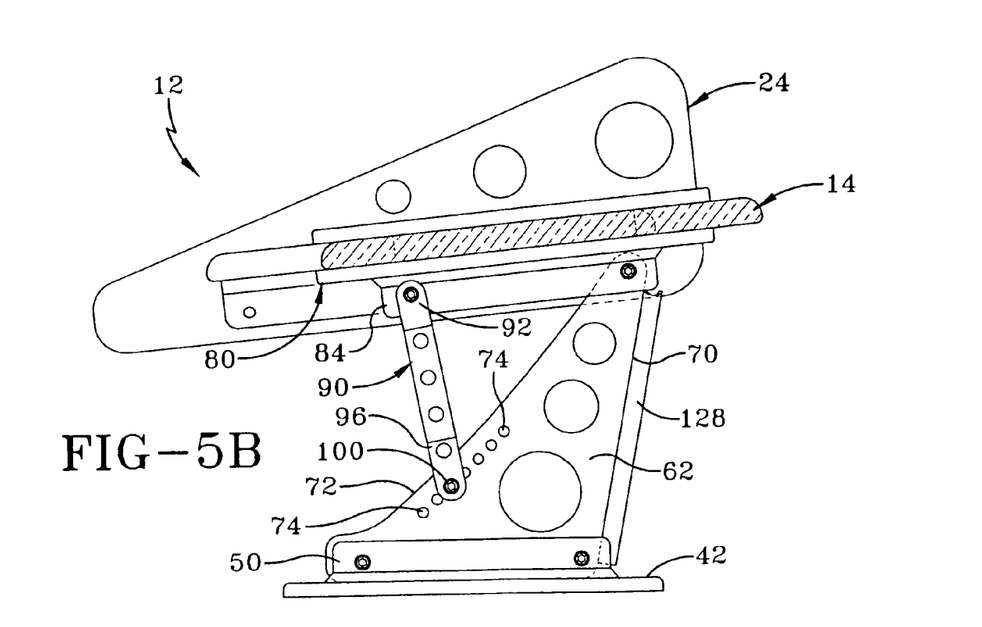

The spoiler 10 includes a pair of adjustable vertical support brackets designated by the numeral 12. Secured to the brackets 12 is a spoiler wing designated generally by the numeral 14. It will be appreciated that the wing may be supported by one or more brackets, but it is believed that two brackets will preferably be used. The brackets 12 are preferably constructed out of billeted aluminum which provides a unique appearance and which is stronger than cast aluminum pieces. Of course, other metal or plastic materials may be used for the adjustable brackets depending on a particular end use. The wing 14 is preferably made of a clear polymeric material such as acrylic and is preferably transparent or translucent. The polymeric material may be tinted with any color dye including flourescent materials. The spoiler 14 includes a top surface 16 opposite a bottom surface 18. An exterior edge 19 connects the top surface to the bottom surface. A design 20 is preferably disposed on the bottom surface 18, although the design 20 may also be provided on the top surface 16. And the exterior edge 19 may be provided with a selectively engraved surface. The design 20 may be any number of things including advertisements, automobile logos, words, phrases, or fanciful designs. It will further be appreciated that the design 20 may be etched or clear, inasmuch as the design will reflect or refract any light that is propagated along the spoiler. To further enhance the appearance of the design it may be filled with opaque or translucent paint or dyes 21 that have luminescent or reflective properties. It will further be appreciated that the wing 14 may be a molded piece which incorporates the fanciful design 20 outwardly or inwardly extending from any surface thereof in a two or three-dimensional configuration as seen in FIG. 4. And designs may be painted or silk screened directly onto the surface of the wing. Any combination of molded surfaces, etchings, paints, dyes, and reflective materials 21 may be applied to the wing to enhance its appearance.

A bracket cap 22 may be used to secure the spoiler wing 14 to the adjustable support brackets 12. Of course, it will be appreciated that the bottom surface 18 may be secured to the support brackets 12 so as to provide a smooth uninterrupted surface from end to end of the spoiler wing 14. If desired, sealing gaskets may be provided between the cap 22 and the wing 14 and/or between the brackets 12 and the wing. Decorative end fins 24 may be installed at each end of the wing 14, wherein each fin 24 includes a fin bracket 26 which may be of any particular shape and or design. An angle bracket 27 is attached by fasteners to the end of the wing 14. The fin bracket 26 may have fin holes 28 therethrough which receive fasteners 29 for attaching the bracket 26 to the angle bracket 27. Each of the end fins 24 may have decorative holes 30 therethrough. Alternatively, the ends of the polymeric wing 14 may be provided with angularly extending tips, or the wing may be wedged-shaped or any shape that can be obtained from a molding or milling operation or any combination thereof.

Referring now to FIGS. 2, 3, 4 and 6, it can be seen that the wing 14 has a light module opening 34 aligned with the position of the adjustable vertical support brackets 12. It will be appreciated that the opening 34 preferably extends through the entire thickness of the wing 14 although it is conceivable that the opening 34 may be an appropriately sized cavity or channel. A light module 36 is received in the opening 34 and will be discussed below.

As can best be seen in FIG. 2 and FIGS. 4—6, the adjustable vertical support bracket 12 includes a base 40, a truss 60, a bracket support plate 80 and a Y-bracket 90. These components coact with one another to support the spoiler wing 14, provide support for the light module 36, and allow for angular adjustment of the spoiler wing 14 with respect to the mounting surface of the entire spoiler 10.

The base 40, which forms the first end of the bracket 12, includes a plate 42 which has a plurality of mounting holes 44 therethrough. A like plurality of mounting fasteners 46 are inserted through the mounting holes 44 to secure the brackets to the mounting surface. Also extending through the plate 42 is a wiring hole 48—best seen in FIG. 6—which receives lead wires from the light module 36. A pair of base rails 50 perpendicularly extend from the plate 42 and form a base channel 52 therebetween. Extending through the base rails 50 are a pair of cross-aligned holes 54.

The truss 60, which is attached to the base 40, includes a triangular-shaped section 62. Of course, the section 62 may be provided in any desired shape. In any event, the section 62 includes a bottom edge 64 which is sized to fit within the base channel 52. The section 62 includes a plurality of channel holes 66 which are aligned with the cross-aligned holes 54 of the base rails 50. An appropriately sized truss fastener 68 is receivable in the channel holes 66 and the cross-aligned holes 54 for fastening the truss 60 to the base 40. The section 62 also provides a wiring edge 70 which is proximately positioned adjacent the wiring hole 48. Extending from the wiring edge 70 to the bottom edge 64 is an adjustment edge 72. Extending through the section 62 are a plurality of truss adjustment holes 74 which are collectively in substantial parallel alignment with the adjustment edge 72. Also extending through the section 62 may be a plurality of wing bracket holes 76 which are for the most part decorative but which also reduce the weight of the overall bracket assembly.

A bracket support plate 80, which forms the second end of the support bracket 12, has a plurality of mounting holes 82 extending therethrough. Perpendicularly extending from the support plate 80 are a pair of rails 84 which form a channel 86 therebetween. Each of the rails 84 have a pair of cross-rail holes 88 extending therethrough. The end of the truss 60 where the wiring edge 70 and the adjustment edge 72 meet is received in the channel 86. The section 62 has a point hole 69 therethrough in the general vicinity of the edges 70 ad 72. And the one pair of the cross-rail holes 88 are aligned with the point hole 69 to receive a fastener 79. All fasteners disclosed herein are preferably threaded fasteners that are mateable with a corresponding nut. Of course, other types of fasteners such as rivets, bindings, or the like could be used.

The Y-bracket 90 is positioned between the support plate 80 and the truss 60. In particular, the Y-bracket 90 provides a pivot end 92 which is pivotably connected to the rails 84 wherein the pivot end 92 has a pivot hole 94 extending therethrough that receives a fastener 95 that is securable through one pair of the rail holes 88. Opposite the pivot end 92 is a truss end 96. The truss end 96 is bifurcated so as to a form a truss gap 98. The truss gap 98 receives the adjustment edge 72 of the section 62. Extending through the truss end 96 are a pair of aligned truss holes 100 which are alignable with any one of the truss adjustment holes 74. The holes 100 and 74 receive a truss fastener 102. Accordingly, as can best be seen in FIGS. 5A and 5B, if a certain angular position is desired, the end user may adjust the position the truss end 96 in any of the truss adjustment holes 74 and secure it in place with the fastener 102. By virtue of the pivotable action of the pivot end 92, various angular configurations of the spoiler may be obtained. In the alternative, the truss 60 and Y-bracket 90 could be inverted so that the bottom edge 64 is received in the bracket support channel 86 and the end of the truss with the point hole 69 is received in the base channel 52. Certain modifications may need to be made to accommodate this change.

Figure 2:
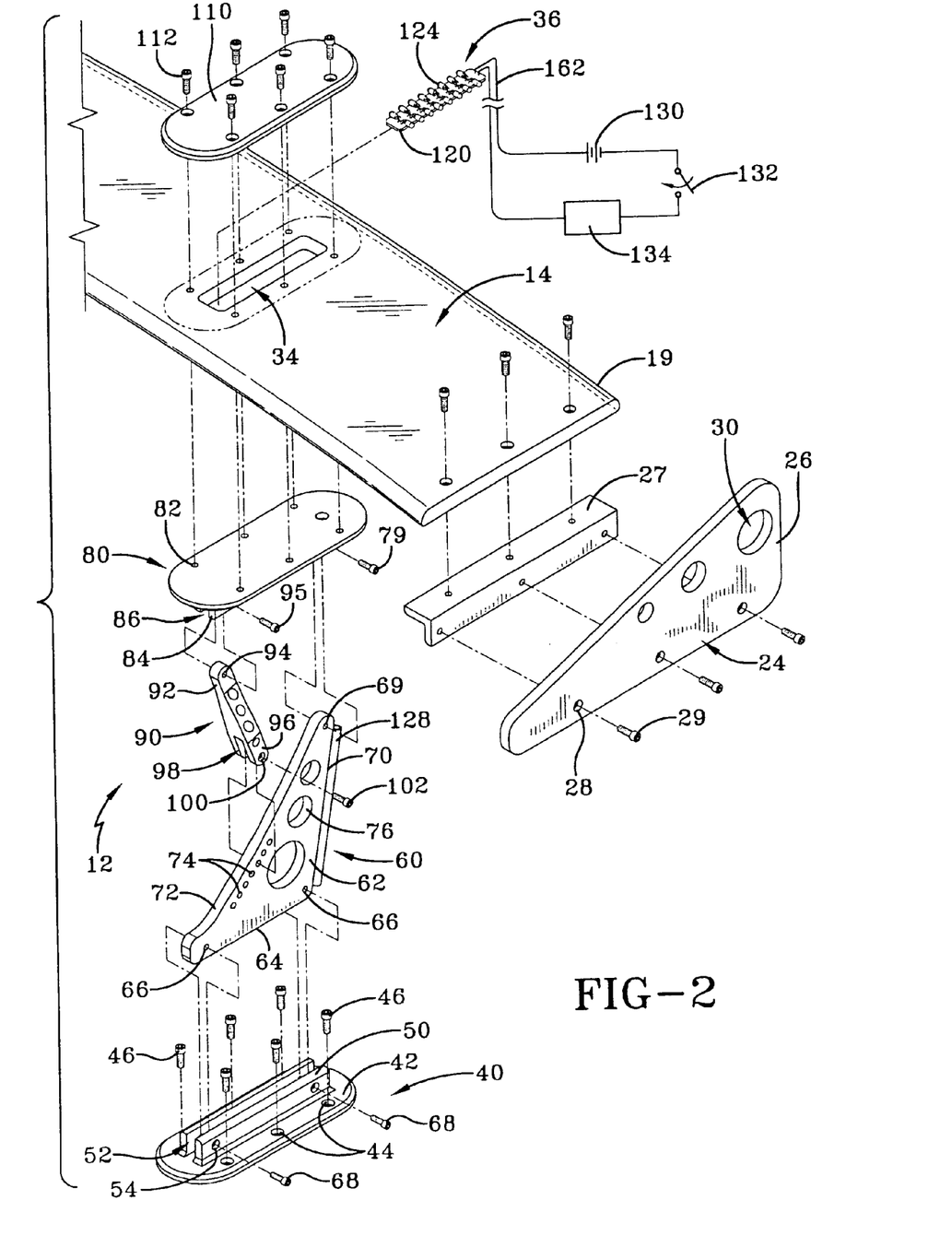
FIG. 2 is an assembly drawing of the illuminated spoiler showing the adjustable bracket feature.
Figure 3:
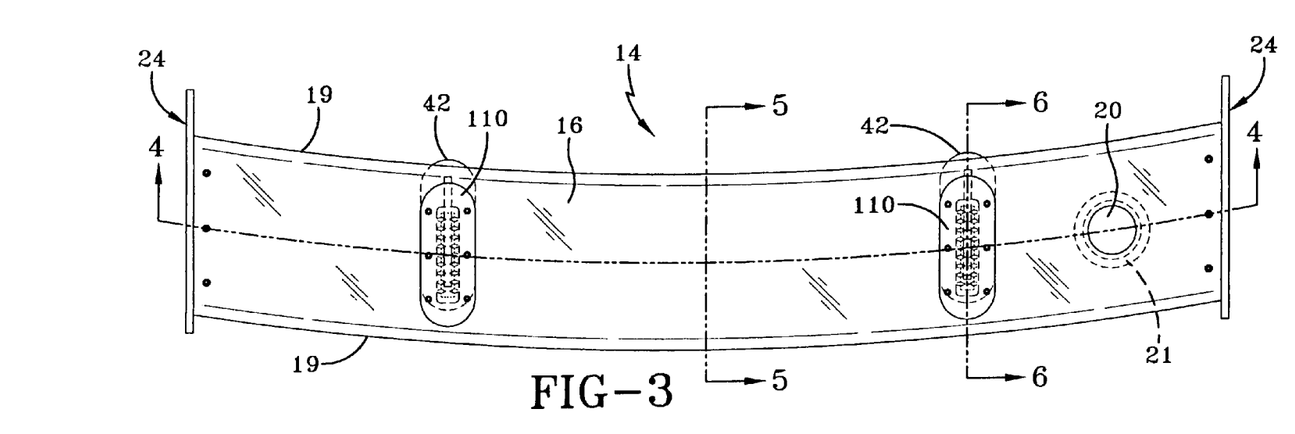
FIG. 3 is a top plan view of the illuminated spoiler according to the present invention.
Figure 6:
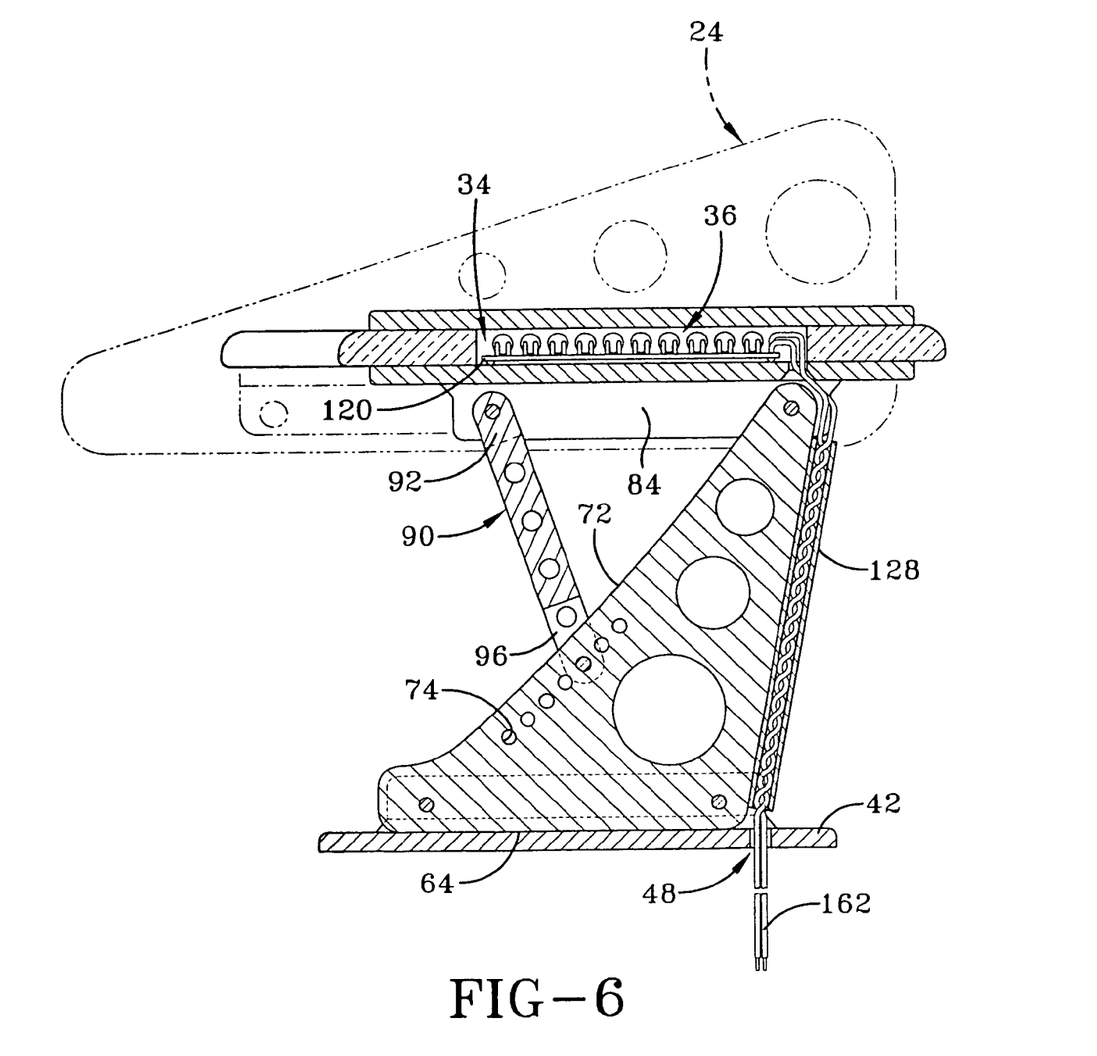
FIG. 6 is a cross-sectional view of the illuminated spoiler taken along line 6—6 of FIG. 3 which illustrates the adjustable bracket and positioning of a lighting module with respect thereto.

The light module 36 is preferably received within the light module opening 34 as best seen in FIGS. 2, 4, and 6. The light module 36 includes a substrate 120 that fits within the confines of the opening 34 as defined thereby and by the positioning of the bracket support plate 80 and the end cap 110. It will be appreciated that the substrate 120 is a printed circuit board which provides the necessary wiring to interconnect a plurality of light elements 124 in a manner well known in the art. The light elements 124 are preferably light emitting diodes (LEDs) in various colors selected by the end user. Indeed, the light elements 124 may be different colors such as red, green, blue or the like. It will also be appreciated that other lighting elements could be used in place of the LEDs such as incandescent bulbs with color filters. It will also be appreciated that the light emitting diodes could be side-emitting LEDs which would allow for a reduction in the size of opening 34. In any event, a pair of lead wires 126 extend from the substrate 120 and are concealed within a wire cap 128 that attaches to the wiring edge 70 of the truss 60. In the alternative, it will be appreciated that the wires 126 may be received in a wire channel milled into the wiring edge and sealed with an appropriate adhesive tape. In any event, the lead wires 126, as best seen in FIG. 2, are connected to a power supply 130 which may either be a dedicated battery source, or an automobile or other vehicle battery which is transformed to the appropriate light module driving voltage. A switch 132 may be connected to the supply 130 and a controller 134 which allows for selective illumination of the elements 124 in a desired manner. The controller 134 may be connected to the circuitry associated with the lighting system of the vehicle. In particular, any electrical signal that is generated by application of a brake and/or a turn signal may be received by the controller 134 for corresponding illumination of the elements 124. Instead of utilizing lead wires it will be appreciated that actuation of the light module 36 may be by a wireless remote. In other words, the switch 132, the supply 130 and the controller 134 may be carried by the substrate and wherein the controller includes an antenna and a receiver for receiving the actuation signals from a transmitter that is likely positioned on or near the dashboard of the vehicle.

It can be seen that the lighting elements 124 are oriented to project light in opposite directions. Accordingly, the entire surface area of the wing may be segmented into a middle zone 142 that is positioned between the adjustable brackets, and a right zone 140 and a left zone 144 which are positioned on either side of the middle zone 142. Accordingly, the brake light signal and/or turn signals sent to the controller 134 may be associated with the respective zones such that application of the vehicle's brake system will illuminate the middle zone 142 while activation of a right turn signal will illuminate the right zone 140 and activation of the left turn signal will illuminate the left zone 144. Illumination of the lighting module 36 is such that the light is transmitted along the length of the essentially transparent wing wherein the light is scattered or reflected upon encountering any design 20 or otherwise modified exterior edges 19 of the wing 14. It will be appreciated that the surfaces of the design 20 and the edge 19 are modified to scatter or reflect the light emanating from the light module in such a way to make the design and edge visibly apparent in the selected color. Accordingly, the substantially clear spoiler wing may be illuminated by activating the LEDs. Further, by selective activation of various colors, various combinations of colors may be made to appear on the spoiler wing so as to distinguish the end-user's vehicle.

Figures 7, 8, 9:
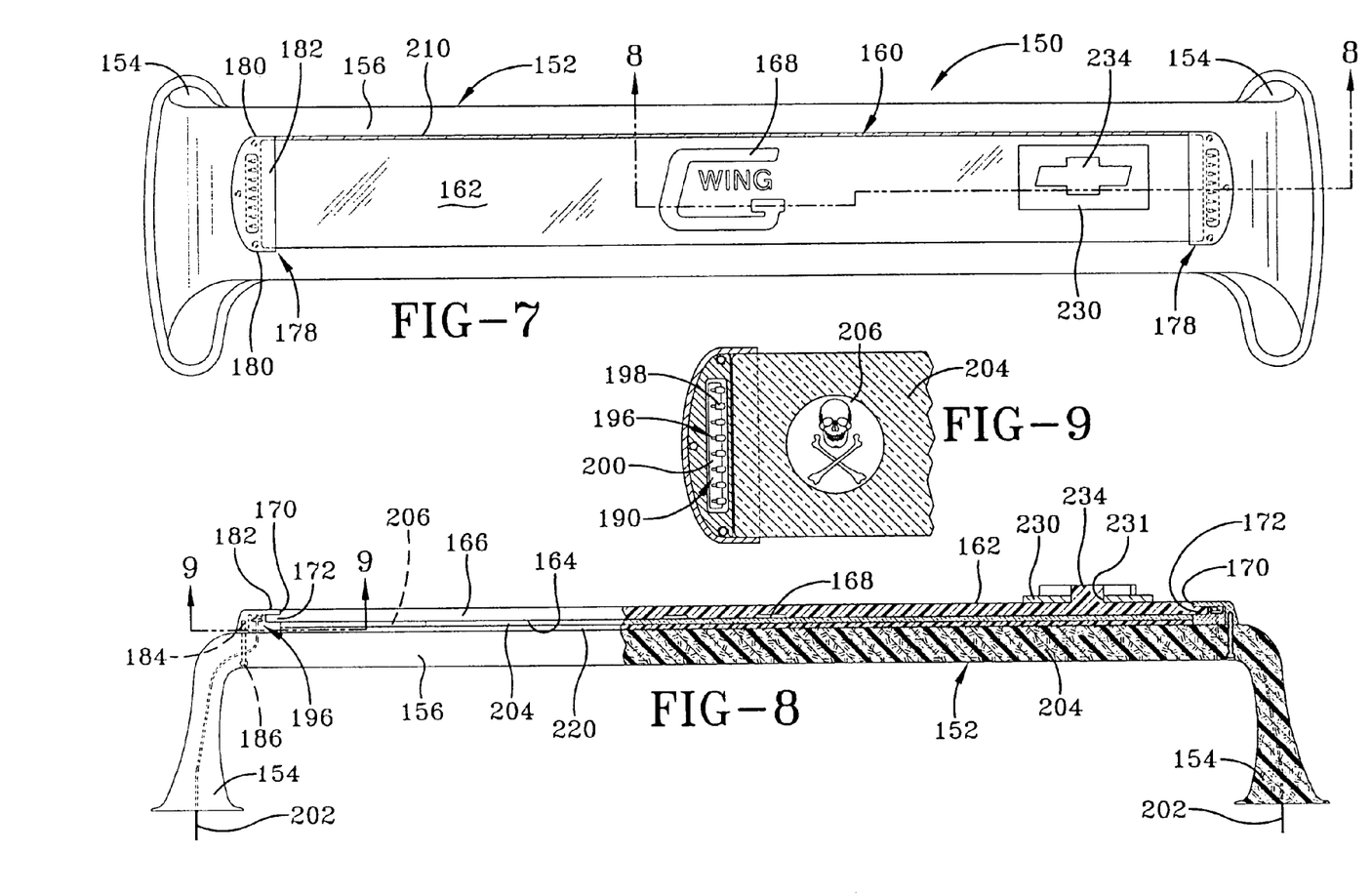
FIG. 7 is a top view of an alternative illuminated spoiler according to the present invention.
FIG. 8 is a cross-sectional view of the alternative illuminated spoiler attachment taken along lines 8—8 of FIG. 7.
FIG. 9 is a cross-sectional view of the alternative illuminated spoiler taken along lines 9—9 of FIG. 8 and illustrating the lighting module.

Referring now to FIGS. 7–9, it can be seen that an alternative accessory in the form of an illuminated spoiler is designated generally by the numeral 150. In this embodiment it is envisioned that the illuminated spoiler 150 may be attached to a factory-installed spoiler 152 or in the alternative may be attached directly to a door, side or other panel of the vehicle. This accessory may also be installed within a vehicle, attached to windows, boating fixtures, and the like. The factory installed spoiler 152 has a pair of vertical supports 154 and a horizontal wing 156. The horizontal wing 156 provides an attachment surface for receiving an illuminated wing portion designated generally by the numeral 160. Of course, the illuminated wing portion 160, which may be any shape, may be attached to any interior or exterior exposed surface of the vehicle or other device. The wing portion 160 provides a top side 162 which is opposite a face side 164. An edge 166 connects the top side 162 to the face side 164. An etching 168 is preferably provided on the face side 164 and it may be of any fanciful three-dimensional design or writing. The wing portion 160 includes a pair of opposite ends 170 which have outwardly extending nubs 172 which may be slightly smaller in surface area than the ends 170.

A pair of end brackets 178 are utilized to secure the wing portion 160 to the vehicle surface 152. In particular, the end brackets 178 provide a side wall 180 from which substantially perpendicularly extends a cover wall 182. The side wall and cover wall are configured to enclose and clamp around the projecting nubs 172. Extending into or through the side walls 180 are a pair of bracket holes 184 for receiving fasteners 186 which attach the brackets to the vehicle surface. The portion 160 may also be secured to a surface with a tape or other adhesive. The side walls 180 and cover wall 182 extend in such a manner so as to a form module cavity 190 when attached to the ends of the wing portion 160. The module cavity 190 receives a light module 196 configured in much the same manner as the light module 36. Accordingly, the light module 196 provides a plurality of light elements 198 which are preferably light emitting diodes of various colors. The LEDs are carried by a circuit board 200 which has leads to interconnect the LEDs to one another and which are further connected to wires 202. The wires 202 are connected to a power supply, switch and controller in much the same way as the wires 162 are connected as shown in FIG. 2. Or, as discussed previously with the light module 36, the module 196 may be operated utilizing wireless components. Accordingly, any lighting sequence or color may be applied to the wing portion 160 such that design and/or the edges are illuminated. It will be appreciated that the entire surface or facing side of the spoiler may be etched or molded in such a way that any light impinging upon the spoiler is reflected, diffracted and/or scattered.

To further enhance the appearance of the wing portion an applique material 204 may be captured between the face side 164 and the vehicle surface 152. In the preferred embodiment the applique material 204 is a material which assists in reflecting, diffusing or refracting the light generated by the lighting elements. The appearance of the material 204 may be further enhanced by any imprinted design 206. Accordingly, a combination of appearances may be generated by the etching design 168 on the face side of the spoiler and the design 206 provided by the applique.

Yet a further enhancement that may be provided to the portion 160 is a trim ring 210 that is selectively secured to the edge of the portion 160. This may be done to reflect or block light in certain areas as desired. The wing portion may be further supplemented by a base layer 220 which is made of the same or similar material as the portion 160. The layer 220 may be provided with the same surface treatments as the portion 160. And the material 204 may or may not be captured between the face side 164 and the layer 220. The portion 160 and the layer 220 may be secured to one another by adhesive, fasteners, sonic welding and the like. With the various treatments—molding, etching, coloring, lighting, shapes, etc.—provided by the portion 160, the layer 220 and the material 204, any number of fanciful designs can be obtained. Gaskets may be used in the sealing of the portion 160 and the layer 220 with or without the material 206 therebetween.

Another modification that may be employed is applying a veneer 230 to the top side 162. The veneer 162 may extend between the vertical supports 154 and assist in retaining the wing 156, the trim ring 210, the base layer 220 and/or the material 204. The veneer 230 may have a hole 231 extending therethrough and allow for an extending portion 234 to be received therein to a desired height. In other words, the portion 234 may be flush, recessed or protruding with respect to the veneer 230. The portion 234 may be selectively illuminated by the light module 196. This allows for another three-dimensional figure to be illuminated. In the alternative, a pocket could be milled into the top side 162 and an appropriately sized veneer 230 placed in the pocket. The veneers may be any material such as plastic, carbon fiber, metal, wood or the like. Indeed, a plastic veneer may be of a different color or tint than the wing portion 160. And it will be appreciated that wing portions, with or without applique materials and/or with or without the veneer may be stacked upon one another to provide a desired visual effect. It will also be appreciated that the veneer 230 with openings therethrough may be used to cover the wing portion 14 of FIG. 1 in a similar manner. Indeed, the spoiler 150, in all its' variations, may be coupled to the spoiler 10. For example, as seen in FIG. 4, the design 20 may be surrounded by the veneer 230 to provide a desired effect. Although the veneer 230 shown in FIG. 4 extends from one side of the design 20 to a proximal end of the spoiler, it will be appreciated that the veneer 230 may extend the entire length of the surface 16 with any desired openings to accommodate designs 20 or not. And to further supplement the appearance of either spoiler 10 or 160, the veneer 230 may have a three-dimensional configuration 232 extending inwardly or outwardly from the surface thereof.

Based upon the foregoing it will be appreciated that the concepts described above provide an improvement in the art. In particular, it is believed that the configuration of the lighting elements with respect to the spoiler wing and their enclosure within the supporting brackets provide a unique configuration inasmuch as the generated light is efficiently distributed along the entire length of the spoiler and illuminated by the etched surfaces. Moreover, the present disclosure is advantageous in that the spoiler wing is replaceable so as to provide various looks that are easily interchangeable. And the utilization of an applique material provides a further enhancement to the appearance of the illuminated spoiler.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A spoiler for a vehicle comprising:
    at least one support bracket having a first end opposite a second end adapted to have said first end secured to the vehicle; and
    a substantially transparent spoiler wing secured to said second end
    a light module coupled to said spoiler wing for illumination thereof;
    wherein said spoiler wing comprises opposed surfaces and wherein a three-dimensional design extends from at least one of said opposed surfaces and a veneer applied to at least one of said surfaces, said veneer having an opening therethrough that at least partially surrounds said three-dimensional design.

2. The spoiler according to claim 1, further comprising:
    a plurality of support brackets, each said support bracket having said second end secured to said spoiler wing.

3. The spoiler according to claim 1, wherein said veneer has a veneer three-dimensional configuration extending therefrom.

4. A lighted attachment comprising:
    at least one bracket adapted to be secured to a surface;
    a substantially transparent wing secured by said at least one bracket to the surface;
    a material interposed between said wing and the surface; and
    a light module coupled to said wing for illumination of said wing
    wherein said wing comprises opposed surfaces and wherein a three-dimensional design extends from at least one of said opposed surfaces.

5. The attachment according to claim 4, wherein said at least one bracket and said wing form a module cavity for receiving said light module.

6. The attachment according to claim 5, wherein said wing has a three-dimensional configuration illuminated by said light module.

7. The attachment according to claim 6, wherein said material has a design extending therefrom.

8. The attachment according to claim 7, wherein said light module has a plurality of different color lighting elements.

9. The attachment according to claim 4, further comprising:
    a base layer interposed between said material and the surface.

10. The attachment according to claim 9, wherein said wing and said base layer each have a three-dimensional configuration illuminated by said light module.

11. The attachment according to claim 4, wherein said wing incorporates a fluorescent dye.

12. The spoiler according to claim 4, further comprising:
    a veneer applied to at least one of said surfaces, said veneer having an opening therethrough that at least partially surrounds said three-dimensional design.

13. The spoiler according to claim 12, wherein said veneer has a veneer three-dimensional configuration extending therefrom.

* * * * *